United States Patent
Xie et al.

(10) Patent No.: US 11,980,191 B2
(45) Date of Patent: May 14, 2024

(54) **COMPOUND MYCORRHIZAL FUNGUS GROWTH PROMOTING AGENT AND AGRICULTURAL-PHOTOVOLTAIC COMPLEMENTARY PLANTING METHOD FOR *DIOSCOREA COMPOSITA***

(71) Applicant: SOUTH CHINA AGRICULTURAL UNIVERSITY, Guangdong (CN)

(72) Inventors: Jun Xie, Guangdong (CN); Chunmei Zhong, Guangdong (CN); Hongdan Zhang, Guangdong (CN); Shangjie Yu, Guangdong (CN)

(73) Assignee: SOUTH CHINA AGRICULTURAL UNIVERSITY, Guangdong (CN)

( * ) Notice: Subject to any disclaimer, the term of this patent is extended or adjusted under 35 U.S.C. 154(b) by 0 days.

(21) Appl. No.: 18/183,170

(22) Filed: Mar. 14, 2023

(65) Prior Publication Data
US 2023/0337683 A1 Oct. 26, 2023

(30) Foreign Application Priority Data

Apr. 25, 2022 (CN) .......................... 202210439282.X (51) Int. Cl.
| | | |
|---|---|---|
| A01N 63/30 | (2020.01) | |
| A01C 1/00 | (2006.01) | |
| A01C 21/00 | (2006.01) | |
| A01G 22/25 | (2018.01) | |
| A01N 63/20 | (2020.01) | |
| A01N 63/28 | (2020.01) | |
| A01P 21/00 | (2006.01) | |

(52) U.S. Cl.
CPC ............... *A01N 63/30* (2020.01); *A01C 1/00* (2013.01); *A01C 21/00* (2013.01); *A01G 22/25* (2018.02); *A01N 63/20* (2020.01); *A01N 63/28* (2020.01); *A01P 21/00* (2021.08)

(58) Field of Classification Search
CPC ......... A01N 63/30; A01N 63/28; A01N 63/20
See application file for complete search history.

(56) References Cited

U.S. PATENT DOCUMENTS

2006/0178269 A1   8/2006   Medina-Vega

FOREIGN PATENT DOCUMENTS

| CN | 103125240 | 6/2013 |
|---|---|---|
| CN | 103947449 | 7/2014 |
| CN | 106472568 | 3/2017 |
| CN | 108101672 | 6/2018 |
| CN | 110257298 | 9/2019 |
| CN | 113004080 | 6/2021 |
| CN | 114540259 | * 5/2022 |

OTHER PUBLICATIONS

Machine translation of CN 114540259 (May 2022).*
Huihui Zhang et al., "Arbuscular Mycorrhizal Fungi (*Glomus mosseae*) Improves Growth, Photosynthesis and Protects Photosystem II in Leaves of *Lolium perenne* L. in Cadmium Contaminated Soil", Original Research, Aug. 13, 2018, pp. 1-16.
Zhen Wang et al., "Draft Genome Analysis Offers Insights Into the Mechanism by Which Streptomyces chartreusis WZS021 Increases Drought Tolerance in Sugarcane", Original Research, Jan. 9, 2019, pp. 1-14.
Che Yongmei et al., "Study on Growth Promoting Effects of Co-inoculation with Different AM Fungi, *Trichoderma harzianum* sp. and Growth-promoting Rhizobacteria", Journal of Qingdao Agricultural University (Natural Science), with English abstract, May 2019, pp. 95-102.
Long Weiwen et al., "Research progress on PGPR/AMF interactions", Chinese Journal of Applied Ecology, with English abstract, Apr. 2000, pp. 311-314.
Dai Mei et al., "Effects and mechanisms of interactions between arbuscular mycorrhizal fungi and plant growth promoting rhizobacteria", Acta Ecologica Sinica, with English abstract, Jun. 2008, pp. 2854-2860.
Xue Yinglong et al., "Mechanisms of Phosphorus Uptake from Soils by Arbuscular Mycorrhizal Fungi", Journal of Soil and Water Conservation, with English abstract, Dec. 2019, pp. 10-20.

* cited by examiner

Primary Examiner — John Pak
(74) Attorney, Agent, or Firm — JCIPRNET (57) ABSTRACT

The present disclosure relates to the technical field of agricultural microorganisms and crop cultivation and more specifically relates to a compound mycorrhizal fungus growth promoting agent and an agricultural-photovoltaic complementary planting method for *Dioscorea composita*. The compound mycorrhizal fungus growth promoting agent for *Dioscorea composita* includes *Glomus mosseae*, *Streptomyces chartreusis* and plant growth promoting rhizobacteria, and can greatly improve photosynthesis of *Dioscorea composita* under a photovoltaic panel and promote growth and development of *Dioscorea composita*. The compound mycorrhizal fungus growth promoting agent is used, an unoccupied land under a solar photovoltaic panel is utilized, and a high-ridge close planting method is used to combine a solar photovoltaic industry and *Dioscorea composita* planting. The whole planting process is easy to operate, the cost is low, and three-dimensional value-added utilization of land is achieved.

5 Claims, 4 Drawing Sheets

COMPOUND MYCORRHIZAL FUNGUS GROWTH PROMOTING AGENT AND AGRICULTURAL-PHOTOVOLTAIC COMPLEMENTARY PLANTING METHOD FOR *DIOSCOREA COMPOSITA*

CROSS-REFERENCE TO RELATED APPLICATION

This application claims the priority benefit of China application serial no. 202210439282.X, filed on Apr. 25, 2022. The entirety of the above-mentioned patent application is hereby incorporated by reference herein and made a part of this specification.

BACKGROUND

Technical Field

The present disclosure belongs to the technical field of agricultural microorganisms and crop cultivation. More specifically, the present disclosure relates to a compound mycorrhizal fungus growth promoting agent and an agricultural-photovoltaic complementary planting method for *Dioscorea composita*.

Description of Related Art

*Dioscorea composita* is a perennial winding herb of *Dioscorea* of *Dioscoreaceae*. The rhizome has a palm shape and a rod shape. The outer skin is rough and black brown, and divided into dorso-ventral surfaces. The root system is completely distributed on the ventral surface. The tuber has sprout spots which are difficult to identify by naked eyes. The *Dioscorea composita* rhizome has high content of saponin and starch, can be used for extracting diosgenin and producing fuel ethanol by fermentation, and has a low production cost. Therefore, demand of *Dioscorea composita* is gradually increased. *Dioscorea composita* is originated in Mexico and a sun plant (also called light-demanding plant). The *Dioscorea composita* is introduced into Yunnan province for trial planting in the 1970s. However, a current planting area of China is far from sufficient. Under a condition that a cultivated land area of China is limited, how to enlarge a planting area of *Dioscorea composita* and improve an industrial value of *Dioscorea composita* is a main problem faced by current *Dioscorea composita* planting.

"Photovoltaic+agriculture" is a new agricultural form. Solar power generation, modern agricultural planting and efficient facility agriculture are combined. A power supply problem required by a power of a water taking irrigation machine is solved. A situation that a land competition of photovoltaic industry and agriculture is further avoided. However, *Dioscorea composita* is a sun plant. Since shielding of a solar photovoltaic panel from sunlight greatly affects a photosynthetically active radiation intensity under the photovoltaic panel, and photosynthesis of *Dioscorea composita*, planting and cultivation of *Dioscorea composita* under the photovoltaic panel are greatly affected.

Aiming at a problem of planting sun plants in an area with limited illumination, the prior art reports that photosynthesis of plants is promoted by microorganisms, for example, a Chinese patent "Mixed microbial flora for promoting photosynthesis of plants" discloses a mixed flora consisting of *Lactococcus fujiensis*, *Aspergillum brasilense* and *Sphingomonas prati* has an obvious effect on promoting photosynthesis of oilseed rape. A Chinese patent "Composite microbial agent for promoting photosynthesis in plant leaves and preparation and use method thereof" discloses that a mixed microbial agent consisting of *Lactobacillus plantarum*, *Rhodopseudomonas palustris* and *Saccharomyces cerevisiae* can increase photosynthetic efficiency of leaves of Hami melon plants.

At present, no microorganism capable of improving photosynthesis efficiency of *Dioscorea composita* is reported. A problem of planting limitation of *Dioscorea composita* still cannot be solved.

SUMMARY

Aiming at the technical problems in the prior art, the present disclosure develops a technology capable of obviously improving photosynthesis and promoting growth of *Dioscorea composita* and an agricultural-photovoltaic complementary high-efficiency planting method for *Dioscorea composita*, and provides a technical support for combining *Dioscorea composita* planting with a solar photovoltaic industry.

A first objective of the present disclosure is to provide a compound mycorrhizal fungus growth promoting agent for *Dioscorea composita*.

A second objective of the present disclosure is to provide use of the compound mycorrhizal fungus growth promoting agent for *Dioscorea composita* in promoting growth and improving photosynthetic efficiency of *Dioscorea composita*.

A third objective of the present disclosure is to provide use of the compound mycorrhizal fungus growth promoting agent for *Dioscorea composita* in preparing a microbial preparation for promoting growth and improving photosynthetic efficiency of *Dioscorea composita*.

A fourth objective of the present disclosure is to provide an agricultural-photovoltaic complementary planting method for *Dioscorea composita* based on the compound mycorrhizal fungus growth promoting agent.

In order to realize the above objectives, the present disclosure is realized by the following technical solutions:

Through a long-term deep research on comprehensive conditions of a photosynthetic property, a plant growth and development property, a growth environment property and the like, of *Dioscorea composita*, the inventor group obtains a compound mycorrhizal fungus growth promoting agent capable of obviously improving photosynthesis of *Dioscorea composita*, which includes *Glomus mosseae*, *Streptomyces chartreusis* and plant growth promoting rhizobacteria, and develops a high-quality cultivation technology of *Dioscorea composita* under a photovoltaic panel based on this. Experimental data show that compared with an uninoculated plant, an inoculated plant with the compound mycorrhizal fungus growth promoting agent under a panel has a plant height increased by nearly 30%, a fresh weight of an overground part increased by nearly 15%, and a fresh weight of an underground part increased by nearly 20%. The content of chlorophyll a can be increased by about 24%, the content of chlorophyll b can be increased by about 9%, the content of total chlorophyll can be increased by about 16%, and a net photosynthetic rate can be increased by about 15%. The compound mycorrhizal fungus growth promoting agent for *Dioscorea composita* provided by the present disclosure greatly improves photosynthesis and growth and development of *Dioscorea composita* under a photovoltaic panel. In addition, a growth state of the inoculated plant inoculated with the compound mycorrhizal fungus growth promoting agent under a panel is almost consistent with that of *Dioscorea composita* planted under normal illumination. The quality of *Dioscorea composita* is hardly influenced.

Therefore, the present disclosure sets forth to protect the following contents:

A compound mycorrhizal fungus growth promoting agent for *Dioscorea composita* includes *Glomus mosseae* (G.m), *Streptomyces chartreusis* WZS021 (WZ) and plant growth promoting rhizobacteria (PGPR).

Preferably, based on volumes of spore suspensions with the same concentration, a use amount ratio of the *Glomus mosseae, Streptomyces chartreusis* and plant growth promoting rhizobacteria is (1-10): (1-10): 1.

More preferably, based on volumes of spore suspensions with the same concentration, a use amount ratio of the *Glomus mosseae, Streptomyces chartreusis* and plant growth promoting rhizobacteria is 3:1:1.

Preferably, spore suspensions of the *Glomus mosseae, Streptomyces chartreusis* and plant growth promoting rhizobacteria have a concentration equal to or greater than 4,000 spores/mL.

Preferably, spore suspensions of the *Glomus mosseae, Streptomyces chartreusis* and plant growth promoting rhizobacteria have a concentration of 4,000-6,000 spores/mL.

Furthermore, a preparation method of the compound mycorrhizal fungus growth promoting agent for *Dioscorea composita* includes the following steps: respectively activating the *Glomus mosseae, Streptomyces chartreusis* and plant growth promoting rhizobacteria, respectively preparing the activated microorganisms into spore suspensions with purified water, and mixing the spore suspensions to obtain the compound mycorrhizal fungus growth promoting agent for *Dioscorea composita*.

Preferably, the activation is performed at 20-28° C. in a dark place.

Furthermore, the plant growth promoting rhizobacteria may be selected from *Flavisolibacter, Lentzea, Solirubrobacter, Bacillus, Pseudomonas, Flavobacteria, Azotobacter, Azospirillum, Enterobacter, Erwinia, Hafnia, Serratia, Alcaligenes, Arthrobacter, Xanthomonas, Klebsiella, Bradyrhizobium*, etc.

Specifically preferably, the plant growth promoting rhizobacteria are selected from *Flavisolibacter*.

More specifically, the *Flavisolibacter* is *Flavisolibacter ginsengiterrae* (Fg).

In addition, the present disclosure further sets forth to protect the following contents:

Use of the compound mycorrhizal fungus growth promoting agent for *Dioscorea composita* in promoting growth and improving photosynthetic efficiency of *Dioscorea composita*.

Use of the compound mycorrhizal fungus growth promoting agent for *Dioscorea composita* in preparing a microbial preparation for promoting growth and improving photosynthetic efficiency of *Dioscorea composita*.

A microbial preparation for promoting growth and improving photosynthetic efficiency of *Dioscorea composita* contains the compound mycorrhizal fungus growth promoting agent for *Dioscorea composita*.

An agricultural-photovoltaic complementary planting method for *Dioscorea composita*, wherein a *Dioscorea composita* seedling is planted after being infected with the compound mycorrhizal fungus growth promoting agent.

The infection treatment is as follows: soaking a root of a *Dioscorea composita* cutting seedling with the compound mycorrhizal fungus growth promoting agent (preferably for 6-8 h) and then field-planting the seedling in nutrient soil containing the compound mycorrhizal fungus growth promoting agent.

Preferably, the nutrient soil is obtained by cultivating *Trifolium repens* with the compound mycorrhizal fungus growth promoting agent for *Dioscorea composita* in the soil, and preparing the nutrient soil containing a spore, a mycelium and an infected root segment.

More specifically, a preparation method of the nutrient soil is as follows: adding the compound mycorrhizal fungus growth promoting agent for *Dioscorea composita* into a culture matrix, scattering *Trifolium repens* seeds, and harvesting the nutrient soil containing a spore, a mycelium and an infected root segment 2-4 months later.

As an optional embodiment, a preparation method of the nutrient soil is as follows: spreading the compound mycorrhizal fungus growth promoting agent for *Dioscorea composita* on a culture matrix, spreading a layer of culture matrix without the growth promoting agent, scattering *Trifolium repens* seeds, spreading a layer of culture matrix without the growth promoting agent, performing watering and planting management, and harvesting the nutrient soil containing a spore, a mycelium and an infected root segment 3 months later.

Preferably, pure river sand is selected as the culture matrix. The culture matrix is firstly sprayed with a potassium permanganate solution (preferably at a concentration of 0.5%), then covered by a film and exposed to the sun (preferably for 3 days), and air-dried by lifting the film (preferably for 3 days).

The planting management is as follows: watering a Hoagland nutrient solution at ½ strength (all nutrient elements are halved) for at least 1 time (preferably once) per week in a seedling stage (within 30 days) of *Trifolium repens*, and watering a Hoagland nutrient solution for at least 1 time (preferably once) per week after a *Trifolium repens* seedling is grown.

Specifically, as an optional embodiment, an agricultural-photovoltaic complementary planting method for *Dioscorea composita* includes a planting link and a management link; the planting link includes land selection, ploughing preparation, compartment forming and fertilization, compartment management and film covering, cutting seedling (seedling) cultivation, nutrient soil cultivation, growth promoting agent infection, and transplanting; and the management link includes rack erecting for leading vines, watering, fertilization, disease and pest control, vine management, topping, and harvesting.

In a specific practical industry, the planting link includes the following steps:

(1) land selection: preferably selecting a loose, breathable and fertile flat land or sandy land with a deep soil layer;

(2) ploughing preparation: preferably, time for ploughing preparation is from late autumn to early spring of the next year and weeds are removed before the ploughing preparation and the land is exposed under the sun for 15-30 days;

(3) compartment forming and fertilization: deeply ploughing the land into a compartment with a compartment ditch depth of 40-60 cm and a compartment ditch width of 90-110 cm (preferably, a compartment ditch depth of 50 cm and a compartment ditch width of 100 cm), and backfilling a base fertilizer and performing fertilization after 20-40 days of exposure to the sun after the ploughing;

(4) compartment management and film covering: after a compartment ditch is leveled, a compartment surface is 15-25 cm (preferably 20 cm) higher than the ground, a lower compartment width is 90-110 cm, an upper compartment width is 70-90 cm (preferably, the lower compartment width is 100 cm and the upper compartment width is 80 cm), and two drainage ditches with a ditch width of 30-50 cm and a ditch depth of 20-40 cm (preferably a ditch width of 40 cm and a ditch depth of 30 cm) are respectively arranged along two sides of a compartment length; one sides, far away from the compartment, of the two drainage ditches are respectively provided with a solar photovoltaic module; a distance between one side, far away from the compartment, of the drainage ditch and a pile foundation at a bottom part of the solar photovoltaic module is 200-220 cm (preferably 210 cm); and a mulching film is covered on the managed compartment surface;

(5) seedling (cutting seedling) cultivation: preferably selecting a *Dioscorea composita* cutting seedling as a semi-lignified branch which is robust in growth and 1-2 mm thick and taking one leaf and one node as a cutting, wherein a length of the node is 4-5 cm, 1 cm of a lower part of the leaf node is left, and ½ of the leaf and an overlong stem are cut off;

(6) nutrient soil cultivation: sequentially spreading a culture matrix, a compound mycorrhizal fungus growth promoting agent for *Dioscorea composita*, and a culture matrix on a culture seedbed, then scattering *Trifolium repens* seeds and performing watering; watering a nutrient solution at ½ strength for 1 time per week in a seedling stage (within 30 days) of *Trifolium repens*, watering a nutrient solution for 1 time per week after a *Trifolium repens* seedling is grown, and harvesting nutrient soil containing a spore, a mycelium and an infected root segment 3 months later;

(7) growth promoting agent infection: soaking a root of the *Dioscorea composita* cutting seedling obtained in (5) in the compound mycorrhizal fungus growth promoting agent for *Dioscorea composita* for 6-8 h; and field-planting the soaked *Dioscorea composita* cutting seedling in the nutrient soil in step (6) and spraying the residual compound mycorrhizal fungus growth promoting agent for *Dioscorea composita* after the soaking in the nutrient soil; and (8) planting (transplanting): optimal planting time of the *Dioscorea composita* cutting seedling in south China is a period from the Beginning of Spring to the Qingming Festival, or a mould rain season, in this period, the *Dioscorea composita* cutting seedling planted in the nutrient soil in (7) is transplanted to the compartment in (4) for planting according to a specification of a plant spacing of 25-35 cm and a compartment row spacing of 25-35 cm (preferably, the plant spacing of 30 cm and the compartment row spacing of 30 cm), 3 rows are planted in each compartment, and root-fixing water is watered thoroughly after the field-planting.

The management link is as follows:

(1) rack erecting for leading vines: erecting a rack for leading vines with a height equal to or greater than 1.5 m before the *Dioscorea composita* grows to have a climbing capability (when the seedling has a height about 30 cm);

(2) watering: performing watering in time to facilitate seedling recovery and rooting if the soil moisture is insufficient in a whole cultivation period;

(3) fertilization: in the seedling stage, performing fertilization in a manner of "small amount in multiple times and low to high concentrations"; preferably, spraying a foliar fertilizer once every 15 days, wherein the foliar fertilizer is a foliar nitrogen fertilizer or monopotassium phosphate; within 6 months of the field-planting, mainly applying the seedling with a growth nitrogen fertilizer; during 6-12 months of the field-planting, applying the seedling with a phosphorus and potassium fertilizer; and for the *Dioscorea composita* with a planting period of more than one year, performing fertilization mainly with a phosphorus and potassium fertilizer and auxiliarily with urea, and performing hole-expanding fertilization for one time before beginning of spring;

(4) disease and pest control: after the field-planting for 2 months, spraying a microbicide water diluent to prevent and treat root rot and anthracnose; and if insect pests appear, spraying a pesticide water diluent for preventing and controlling;

(5) vine management: winding, trimming and cleaning vines of the *Dioscorea composita*; and when the *Dioscorea composita* has a large amount of male flowers, female flowers and old leaves, trimming and cleaning the *Dioscorea composita*;

(6) topping: when the main vine of the *Dioscorea composita* grows to a certain height, removing one section of a terminal bud of the *Dioscorea composita* or controlling the seedling by spraying a pesticide, and performing multiple topping in a whole field growth stage;

(7) harvesting: performing harvesting 2-3 years after the planting of the *Dioscorea composita*, wherein harvesting time is from November to May in the next year.

The present disclosure has the following beneficial effects:

(1) The present disclosure provides an excellent compound mycorrhizal fungus growth promoting agent for *Dioscorea composita* capable of improving photosynthesis and promoting growth. The compound mycorrhizal fungus growth promoting agent can greatly improve photosynthesis of the *Dioscorea composita* under a photovoltaic panel and promote growth and development. A growth state of the inoculated plant inoculated with the growth promoting agent under a photovoltaic panel is almost consistent with that of the *Dioscorea composita* planted under normal illumination. The present disclosure provides a foundation for promoting normal growth of *Dioscorea composita* under a photovoltaic panel and realizes stereoscopic value-added utilization of land.

(2) The present disclosure provides an agricultural-photovoltaic complementary planting method. The compound mycorrhizal fungus growth promoting agent is used, an unoccupied land under a solar photovoltaic panel is utilized, and a high-ridge close planting method is used to combine a solar photovoltaic industry and *Dioscorea composita* planting. The whole planting process is easy to operate, the cost is low, a power generation capacity without pollution and emission is ensured, additional land is not occupied, and stereoscopic value-added utilization of land is achieved.

DESCRIPTION OF THE EMBODIMENTS

The present disclosure is further described with reference to the drawings and specific examples of the description, but the examples are not intended to limit the present disclosure in any form. Unless otherwise specified, the reagents, methods and equipment used in the present disclosure are conventional in the art.

Unless otherwise specified, the reagents and materials used in the examples are commercially available.

Sources of strains used in examples 1-3: *Glomus mosseae* (G.m) and *Streptomyces chartreusis* WZS021 (WZ) are from the Institute of Microbiology, Guangdong Academy of Sciences; and plant growth promoting rhizobacteria are selected from *Flavisolibacter* gingsengiterrae (Fg) and from Ningbo MingzhouBio. *Flavisolibacter ginsengiterrae* has been preserved on August, 2005 in Leibniz Institute DSMZ-German Collection of Microorganisms and Cell Cultures, wherein the preservation number is DSM No: 18136, and the preservation address is Braunschweig, Germany.

The same *Flavisolibacter* gingsengiterrae was also deposited at the Korean Collection for Type Cultures in the Republic of Korea as Deposit number KCTC 12656.

The soil used by the present disclosure is taken from Huaiji, Zhaoqing. It is determined that the organic matter content is 30.9 g/kg, the alkali-hydrolyzable nitrogen is 151 mg/kg, and the rapidly available phosphorus is 53.8 mg/kg.

Example 1

A preparation of a compound mycorrhizal fungus growth promoting agent for *Dioscorea composita* is as follows:
(1) strain activation and spore suspension preparation: the *Glomus mosseae*, *Streptomyces chartreusis* and plant growth promoting rhizobacteria were respectively activated in a dark place in an incubator at 25° C., and then the strains were respectively prepared into spore suspensions with a concentration of 4,000 spores/mL using purified water; and
(2) the three spore suspensions were mixed at a ratio of 3:3:1 to obtain the compound mycorrhizal fungus growth promoting agent for *Dioscorea composita*.

Example 2

A preparation of a compound mycorrhizal fungus growth promoting agent for *Dioscorea composita* is as follows:
(1) strain activation and spore suspension preparation: the *Glomus mosseae*, *Streptomyces chartreusis* and plant growth promoting rhizobacteria were respectively activated in a dark place in an incubator at 20° C., and then the strains were respectively prepared into spore suspensions with a concentration of 5,000 spores/mL using purified water; and
(2) the three spore suspensions were mixed at a ratio of 1:1:1 to obtain the compound mycorrhizal fungus growth promoting agent for *Dioscorea composita*.

Example 3

A preparation of a compound mycorrhizal fungus growth promoting agent for *Dioscorea composita* is as follows:
(1) strain activation and spore suspension preparation: the *Glomus mosseae*, *Streptomyces chartreusis* and plant growth promoting rhizobacteria were respectively activated in a dark place in an incubator at 28° C., and then the strains were respectively prepared into spore suspensions with a concentration of 6,000 spores/mL using purified water; and
(2) the three spore suspensions were mixed at a ratio of 10:10:1 to obtain the compound mycorrhizal fungus growth promoting agent for *Dioscorea composita*.

Example 4

An agricultural-photovoltaic complementary planting method for *Dioscorea composita* was inoculating the compound mycorrhizal fungus growth promoting agent of example 1 into a *Dioscorea composita* cutting seedling for planting.

Figure 1:
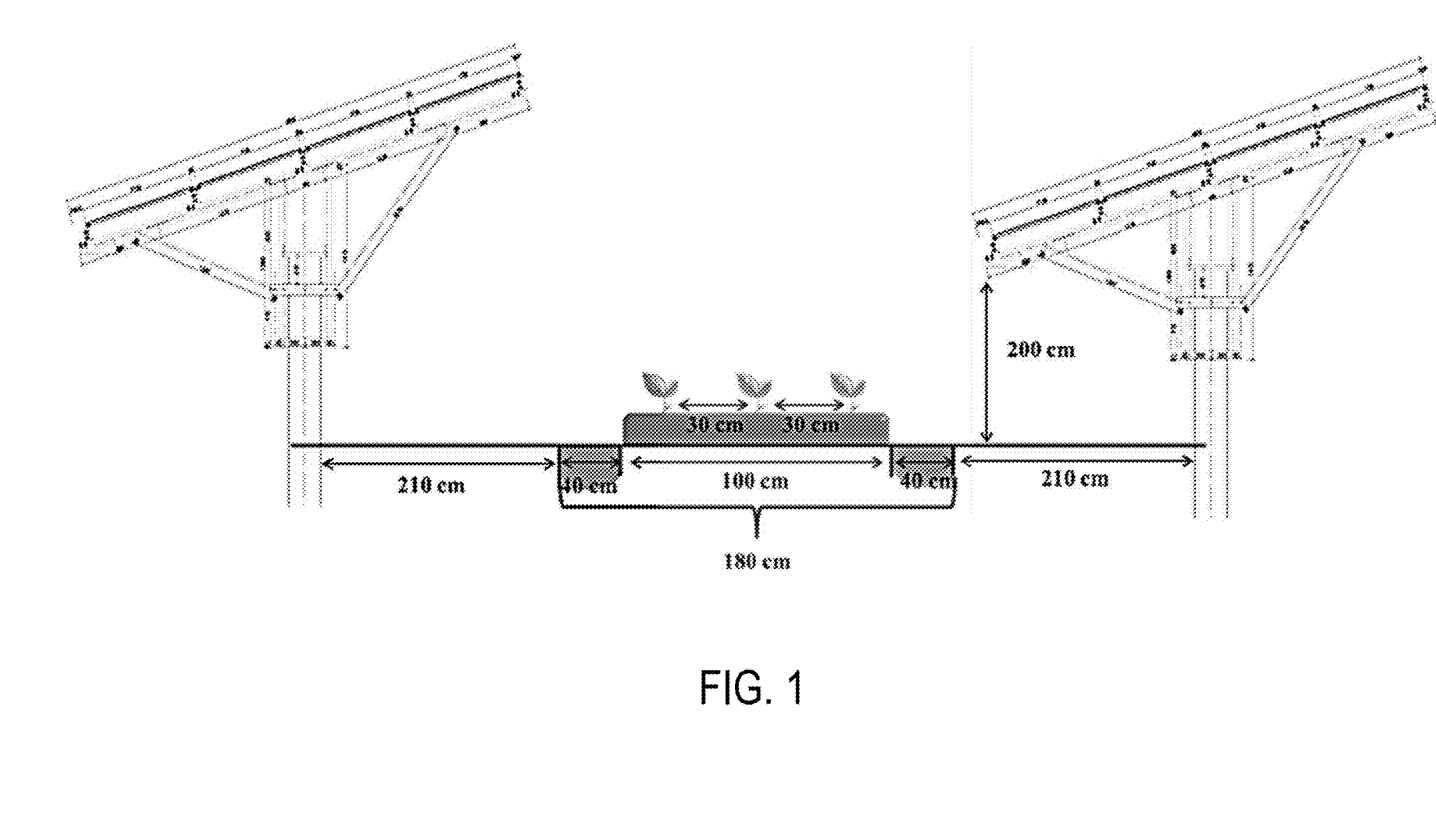
FIG. 1 is a schematic diagram of a *Dioscorea composita* planting area under a photovoltaic panel.

In a specific practical industry, the agricultural-photovoltaic complementary planting method for *Dioscorea composita* included a planting link and a management link, wherein the planting link included the following steps:
(1) land selection: a loose, breathable and fertile flat land or sandy land with a deep soil layer is selected, and the land with a flat terrain, a good drainage and no water-logging threat was selected as far as possible;
(2) ploughing preparation: time for ploughing preparation was from late autumn to early spring of the next year and weeds in a field were comprehensively removed by spraying glyphosate before the ploughing preparation and the land is exposed under the sun for 20 days after the spraying;
(3) compartment forming and fertilization: the land was arranged by a small machine and deeply ploughed into a compartment with a compartment ditch depth of 50 cm and a compartment ditch width of 100 cm, a length of a compartment ditch follows the terrain, and the compartment was exposed to the sun for about one month after being ploughed and backfilled with a base fertilizer; and 50 kg/mu of lime was spread in the compartment ditch, organic wastes such as weeds, sugarcane leaves and straws were spread, then 50 kg/mu of lime was spread, 1 kg/plant of a farmyard manure was added with 3,500 kg of the manure was fertilized in each mu, then a layer of soil was covered on the farmyard manure, and 300 kg/mu of a calcium magnesium phosphate fertilizer was fertilized on the soil layer;
(4) compartment (planting land) management and film covering: the compartment was managed using a small agricultural machine, after the compartment ditch was leveled, as shown in FIG. 1, a compartment surface was 20 cm higher than the ground, a lower compartment width was 100 cm, an upper compartment width was 80 cm, a compartment length follows the terrain, and two drainage ditches with a ditch width of 40 cm and a ditch depth of 30 cm are respectively arranged at two sides of the compartment length; one sides, far away from the compartment, of the two drainage ditches are respectively provided with a solar photovoltaic module, and specifically, the solar photovoltaic module is a solar photovoltaic panel; a distance between one side, far away from the compartment, of the drainage ditch and a pile foundation at a bottom part of the solar photovoltaic module is 210 cm; and a mulching film was covered on the managed compartment surface, evenly covered on the compartment surface, and compacted with soil to prevent air leakage and heat dissipation;

(5) seedling (cutting seedling) cultivation: *Dioscorea composita* was transplanted into a cutting nursery for culture, white small spots can be seen at a bud of a base part after about 15 days of cutting, white roots can grow after about 20 days, and a small amount of tender buds can grow after about 30 days, humidity of a seedbed of the cutting nursery was controlled, a compound fertilizer at a mass concentration of 0.2% and carbendazim at a mass concentration of 0.1% were sprayed, and a *Dioscorea composita* cutting seedling was obtained after leaving the nursery when the *Dioscorea composita* cutting seedling was cultured to about 85 days and a length of a tuber of the cutting seedling was equal to or greater than 2 cm;

(6) nutrient soil cultivation: pure river sand was selected as a culture matrix, and the culture matrix was firstly sprayed with 0.5% of a potassium permanganate solution, then covered by a film and exposed to the sun for 3 days, and air-dried by lifting the film for 3 days; ⅓ of the culture matrix was firstly arranged on the culture seedbed, the compound mycorrhizal fungus growth promoting agent for *Dioscorea composita* prepared in example 1 was sprayed (criteria for spraying amount: based on a basin with a size of 80 cm*50 cm*10 cm (length*width*height), 1,000-2,000 ml/basin), then after ⅓ of the culture matrix was spread, *Trifolium repens* seeds were scattered (since the compound mycorrhizal fungus growth promoting agent cannot be used for complete and pure culture, the *Trifolium repens* seeds and the compound mycorrhizal fungus growth promoting agent were used together for symbiotic propagation, then 2 cm of the culture matrix was spread, and water was performed; a nutrient solution at ½ strength was watered for 1 time per week in a seedling stage (within 30 days) of *Trifolium repens* (all nutrient elements were halved and criteria: based on a basin with a size of 80 cm*50 cm*10 cm (length*width*height), 300-500 ml/basin); a nutrient solution was watered for 1 time per week after a *Trifolium repens* seedling was grown; and nutrient soil containing a spore, a mycelium and an infected root segment was harvested 3 months later;

(7) growth promoting agent infection: a root of the *Dioscorea composita* cutting seedling in step (5) was soaked in the compound mycorrhizal fungus growth promoting agent for *Dioscorea composita* prepared in example 1 for 6-8 h; and the soaked *Dioscorea composita* cutting seedling was field-planted in the nutrient soil in step (6) and the residual compound mycorrhizal fungus growth promoting agent for *Dioscorea composita* after the soaking was sprayed in the nutrient soil; and (8) planting (transplanting): optimal planting time of the *Dioscorea composita* cutting seedling in the south China was a period from the Beginning of Spring to the Qingming Festival, or a mould rain season, in this period, the *Dioscorea composita* cutting seedling growing and developed in (7) was transplanted to the compartment in (4) for planting according to a specification of a plant spacing of 30 cm and a compartment row spacing of 30 cm, a small hole was dug in the compartment surface, the *Dioscorea composita* cutting seedling inoculated with the growth promoting agent was planted, 3 rows were planted in each compartment, and then the soil was backfilled; and the *Dioscorea composita* cutting seedling was buried in the soil as a whole and covered with 2-3 cm of soil, root-fixing water was watered thoroughly after the field-planting, and the amount of the watering can be gradually reduced until the *Dioscorea composita* cutting seedling germinated and grew.

The management link included the following steps:

(1) rack erecting for leading vines: a rack was erected for leading vines before the *Dioscorea composita* cutting seedling grew to have a climbing capability, generally, the rack was erected when the *Dioscorea composita* cutting seedling grew to a height about 30 cm, a height of the rack for leading vines was equal to or greater than 1.5 m, the rack for leading vines was mainly a herringbone rack, and at the same time, a photovoltaic rack can be used as a support point; and the rack for leading vines used the photovoltaic rack as a support point, such that use of bamboo poles can be reduced, and the planting cost was further reduced;

(2) watering: watering was performed in time to facilitate seedling recovery and rooting if the soil moisture was insufficient in a whole cultivation period;

(3) fertilization: within 6 months of the field-planting, in a manner of "small amount in multiple times and low to high concentrations", a foliar nitrogen fertilizer at a mass concentration of 0.3% or monopotassium phosphate at a mass concentration of 0.1% were sprayed every 15 days; a leaf back and a leaf surface were uniformly sprayed each time until water drops dropped downwards preferably; after the field-planting for 3 months, a fertilizer was applied for the first time to a root part to accelerate growth of the seedling; within 6 months of the field-planting, the seedling was mainly applied with a growth nitrogen fertilizer (namely, a mass fraction of the growth nitrogen fertilizer in the fertilizer was greater than 50%); and during 6-12 months of the field-planting, the seedling was mainly applied with a phosphorus and potassium fertilizer (namely, a mass fraction of the phosphorus and potassium fertilizer in the fertilization was greater than 50%) to accelerate growth and expansion of an underground tuber of the seedling; for *Dioscorea composita* with a planting period more than one year, during top dressing in spring of the second year, a phosphorus and potassium fertilizer was mainly applied (namely, a mass fraction of the phosphorus and potassium fertilizer in the fertilizer was greater than 50%), and hole-expanding fertilization was performed for one time before beginning of spring; and a hole was dug in a position 10 cm away from each seedling at a width of 15 cm and a depth of 10-15 cm, each seedling was applied with 100 g of a compound fertilizer, and daily management was performed according to a conventional method; and weeds were timely removed in the seedling stage and *Dioscorea composita* tubers and root systems should not be damaged to avoid influence on growth of the *Dioscorea composita*;

(4) disease and pest control: after the field-planting for 2 months, 500-600 times of a water diluent of mancozeb at a mass concentration of 80%, or 900-1,000 times of a water diluent of thiophanate-methyl at a mass concentration of 50%, or 1,000-1,500 times of a water diluent of carbendazim at a mass concentration of 50% were sprayed to prevent and treat root rot and anthracnose; and if insect pests appeared, 1,500 times of a water diluent of dimethoate emulsifiable concentrate at a mass concentration of 40%, or 1,000 times of a water diluent of a dichlorvos emulsion at a mass concentration of 80% or 1,000 times of a water diluent of a phoxim emulsifiable concentrate at a mass concentration of 50% was sprayed for control;

(5) vine management: after the planted *Dioscorea composita* was managed for one year, the *Dioscorea composita* grew faster in the second year, vines of the *Dioscorea composita* were wound, trimmed and cleaned, such that the *Dioscorea composita* had a good plant type and growth vigor; and when the *Dioscorea composita* had a large amount of male flowers, female flowers and old leaves, the *Dioscorea composita* was trimmed and cleaned to ensure a good permeability, a large amount of nutrient consumption on a flowering branch was avoided, and expanded growth of an underground tuber was influenced;

(6) topping: when the main vines of the *Dioscorea composita* grew to 100 cm, artificial topping was performed, i.e. a part 10 cm from a top bud of the *Dioscorea composita* was picking off by hands or sprayed with a pesticide (chlormequat chloride), and multiple topping was performed in a whole field growth stage; and the topping can promote a large amount of new branches and leaves of the *Dioscorea composita* to rapidly form and further improved a photosynthetic product; and (7) harvesting: *Dioscorea composita* grown in 2-3 years was harvested using a small agricultural machine, wherein an optimal harvesting period of the *Dioscorea composita* was from November per year to May of the next year.

It was determined that by using the agricultural-photovoltaic complementary planting method for *Dioscorea composita* of the example, under a normal growth state, a 1-year-old tuber of the *Dioscorea composita* had an average depth of 30-40 cm, a root width of 15-20 cm, and an average net weight of 0.6-1.2 kg; a 2-year-old tuber had an average height of 40-45 cm, a root width of 40-50 cm, an average single plant net weight of 3-6 kg, and a highest single plant net weight of 10 kg; and a 3-year-old tuber had an average height of 50-60 cm, a root width of 50-65 cm, an average single plant net weight of 8-12 kg, and a highest single plant net weight of 20 kg.

Comparative Example 1

Comparative example 1 differs from example 4 in that: the *Dioscorea composita* in comparative example 1 was planted in a normal direct sunlight area and no solar photovoltaic module was arranged on two sides of a compartment surface to shield sunlight; and the *Dioscorea composita* in comparative example 1 was not inoculated with the compound mycorrhizal fungus growth promoting agent for *Dioscorea composita*.

Comparative Example 2

Comparative example 2 differs from example 4 in that: the *Dioscorea composita* in comparative example 2 was not inoculated with the compound mycorrhizal fungus growth promoting agent for *Dioscorea composita*.

Comparative Example 3

Comparative example 3 differs from example 4 in that: an ingredient microorganism in the growth promoting agent inoculated into the *Dioscorea composita* in comparative example 3 was *Glomus mosseae*.

Comparative Example 4

Comparative example 4 differs from example 4 in that: an ingredient microorganism in the growth promoting agent inoculated into the *Dioscorea composita* in comparative example 4 was *Streptomyces chartreusis*.

Comparative Example 5

Comparative example 5 differs from example 4 in that: ingredient microorganisms in the growth promoting agent inoculated into the *Dioscorea composita* in comparative example 5 were *Glomus mosseae* and *Streptomyces chartreusis*.

Test Example 1

(1) Light Intensity Detection of Different Planting Areas

In order to investigate whether conditions such as light intensity and soil under a solar photovoltaic module are suitable for a planting requirement of *Dioscorea composita*, a light intensity detection on an area under the solar photovoltaic module on the spot was carried out at an early stage (Huaiji, Zhaoqing).

Figure 2:
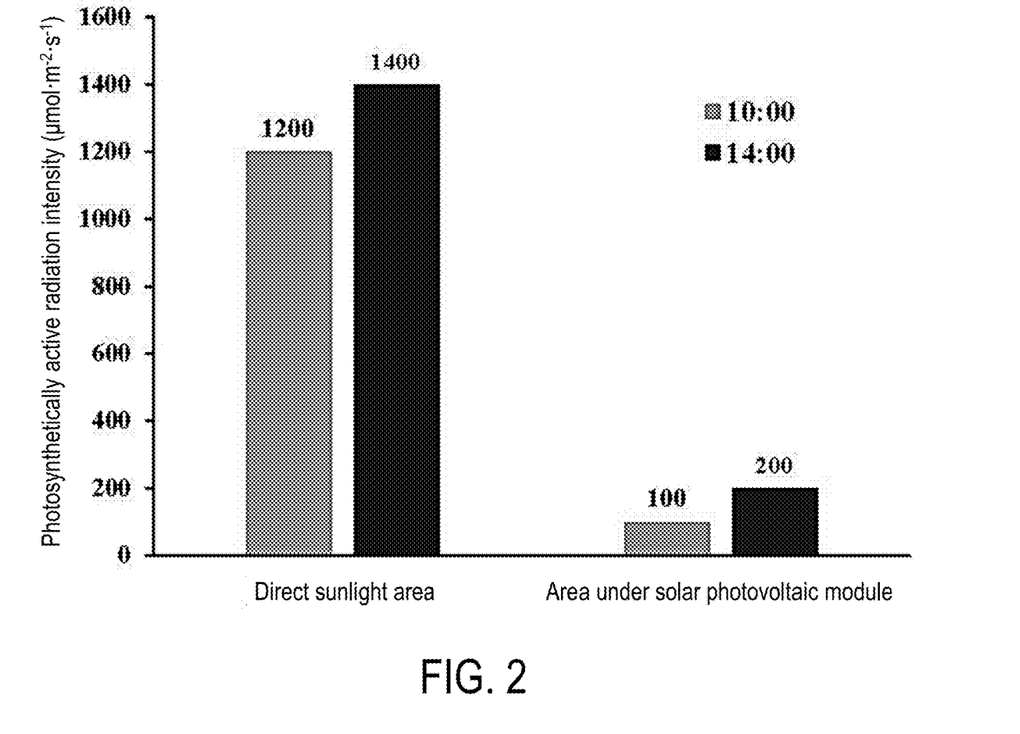
FIG. 2 shows photosynthetically active radiation intensities in a direct sunlight area and a photovoltaic planting area in different periods of time.

As shown in FIG. 2, the results showed that under sunny days in winter, the light intensity of the area under the solar photovoltaic module was about 100-200 $\mu mol \cdot m^{-2} \cdot s^{-1}$. In addition, due to different slope gradients, distances among photovoltaic panels on each slope were varied, when the slope gradient was larger, the distance among the photovoltaic panels were larger, and a photosynthetically active radiation intensity of a slope with a larger slope gradient was improved by about 10-20%. The lowest light intensity of the direct sunlight area was 1,200 $\mu mol \cdot m^{-2} \cdot s^{-1}$.

(2) Simulated Measurement of Net Photosynthetic Rate of *Dioscorea composita*

Photosynthesis is a basis of plant growth. A net photosynthetic rate may reflect a rate of net organic accumulation in a plant. A greater net photosynthetic rate indicates a greater net production by a plant and a greater photosynthesis.

Figure 3:
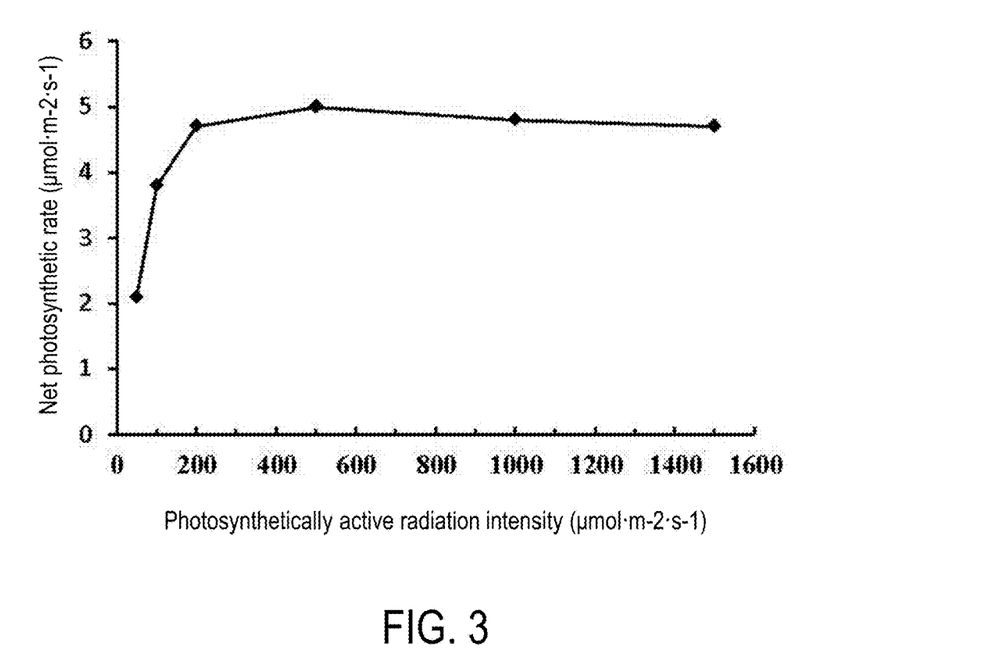
FIG. 3 shows a net photosynthetic rate change of *Dioscorea composita* under different photosynthetically active radiation intensities.

Aiming at environmental conditions of a solar photovoltaic planting area, a simulated measurement of a net photosynthetic rate of *Dioscorea composita* was carried out. As shown in FIG. 3, it was found that a maximum light saturation point of *Dioscorea composita* was between 500-1,000 $\mu mol \cdot m^{-2} \cdot s^{-1}$. At the same time, a net photosynthetic rate of about 3.8 $\mu mol \cdot m^{-2} \cdot s^{-1}$ can be maintained at 100 $\mu mol \cdot m^{-2} \cdot s^{-1}$. Under the condition, *Dioscorea composita* hardly grew well.

Test Example 2

Figure 4:
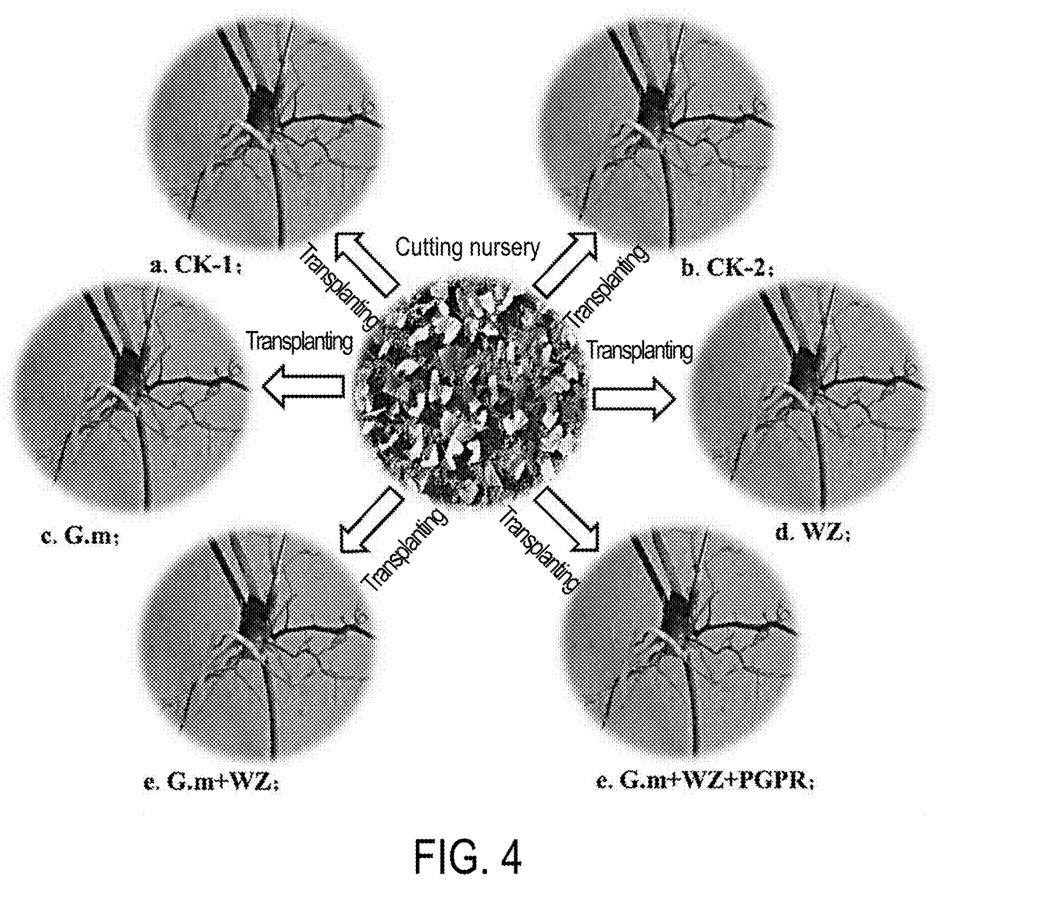
FIG. 4 is a schematic diagram of infection of each experimental group and comparative group; wherein G.m+WZ+PGPR group is example 4; CK-1 group is comparative example 1; CK-2 group is comparative example 2; G.m group is comparative example 3; WZ group is comparative example 4; and G.m+WZ group is comparative example 5.

1. The growth promoting agent of example 1 was taken as an example, according to the method of example 4, a planting experiment under a solar photovoltaic module was performed in Huaiji, Zhaoqing, and example 4 was compared with comparative examples 1-5 (as shown in FIG. 4); and net photosynthetic rate changes of the examples and comparative examples were tested at different photosynthetically active radiation intensities.

2. Experimental Results (1) Net Photosynthetic Rate Change of Each Group

Figure 5:
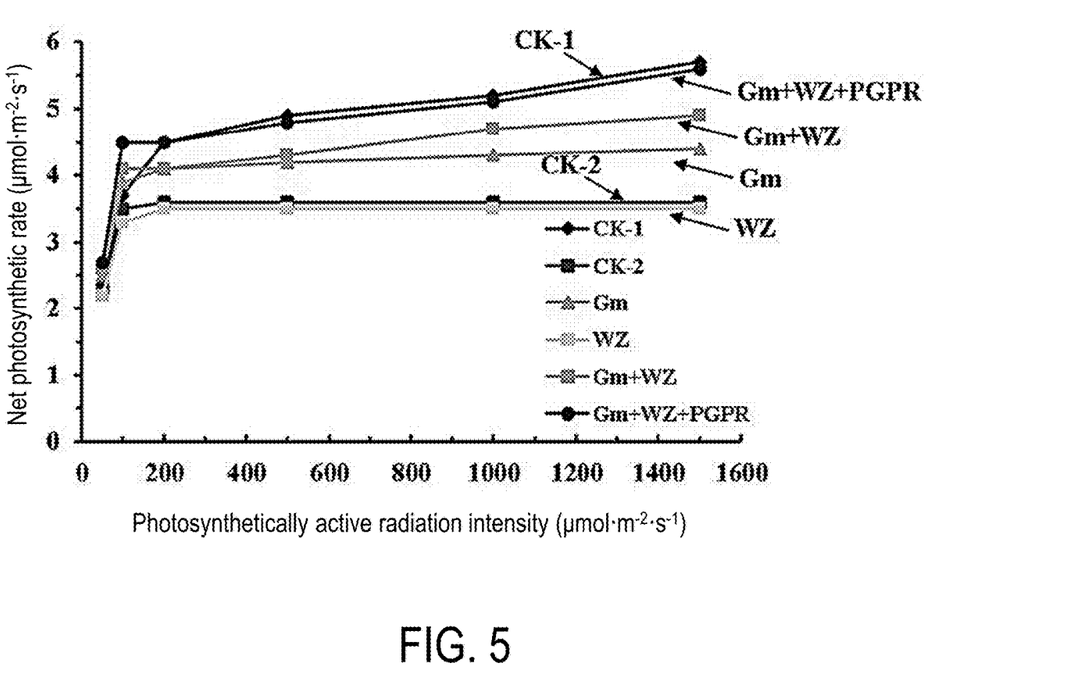
FIG. 5 shows net photosynthetic rate changes of *Dioscorea composita* cutting seedlings under inoculation treatment with different compound mycorrhizal fungus growth promoting agents.

As shown in FIG. 5, the net photosynthetic rate of the *Dioscorea composita* cutting seedling in comparative example 2 was much lower than that of the *Dioscorea composita* cutting seedling in comparative example 1, which indicated that growth of the *Dioscorea composita* planted under the solar photovoltaic planting area was obviously inhibited and the *Dioscorea composita* cannot grow well.

As shown in FIG. 5, when different mycorrhizal growth promoting agents were inoculated, a utilization degree of light energy by *Dioscorea composita* leaves showed different changes. With regard to a light compensation point of leaves of *Dioscorea composita* cutting seedling, the net photosynthetic rate of example 4 was better than that of comparative examples 5, 4 and 3, and the net photosynthetic rate of comparative example 2 was the worst. When a photosynthetic effective intensity was greater than 50 $\mu mol \cdot m^{-2} \cdot s^{-1}$, the net photosynthetic rate of leaves of example 4 was obviously better than that of comparative examples 3-5, the net photosynthetic rate of leaves of comparative example 5 was also obviously better than that of comparative example 2, and the net photosynthetic rate of leaves in comparative example 4 was the lowest.

(2) Influence of Compound Mycorrhizal Fungus Growth Promoting Agent for *Dioscorea composita* on *Dioscorea composita* Photosynthesis As shown in Table 1 above, the treatment with the compound mycorrhizal fungus growth promoting agent for *Dioscorea composita* did not greatly affect the chlorophyll content of *Dioscorea composita* leaves at 30 days of the treatment. However, after 60 days, the *Dioscorea composita* plant in example 4 inoculated with the compound mycorrhizal growth promoting agent under a photovoltaic panel had a best effect, and contents of chlorophyll and components thereof were significantly increased, wherein the content of chlorophyll a was maximally increased by about 23.7%, the content of chlorophyll b was maximally increased by 8.9%, the total chlorophyll content was maximally increased by 16.1%, and the net photosynthetic rate was maximally increased by 14.6% compared with an uninoculated plant under a photovoltaic panel. 90 days after the inoculation, compared with the plant growing under normal illumination, the plant in example 4 showed the maximum chlorophyll a content of about 97.3%, the maximum chlorophyll b content of about 98.6%, the maximum total chlorophyll content of about 97.9%, and the maximum net photosynthetic rate of about 98%. The results indicated that inoculation with the compound mycorrhizal growth promoting agent could improve the photosynthetic efficiency of the *Dioscorea composita* cutting seedlings. A growth state of the *Dioscorea composita* inoculated with the compound mycorrhizal growth promoting agent under a photovoltaic panel was basically consistent with that of the *Dioscorea composita* under normal illumination.

TABLE 1

Influence of compound mycorrhizal growth promoting agent on chlorophyll content and net photosynthetic rate of *Dioscorea composita*

| Sampling time | Treatment | Chlorophyll a (%) | Chlorophyll b (%) | Total chlorophyll (%) | Net photosynthetic rate ($\mu mol \cdot m^{-2} \cdot s^{-1}$) |
|---|---|---|---|---|---|
| 30 d | Comparative example 1 | 4.76a | 3.72a | 8.48a | 4.7a |
| | Comparative example 2 | 3.35b | 2.98b | 6.33b | 3.8b |
| | Comparative example 3 | 3.76b | 3.11a | 6.87b | 4.1a |
| | Comparative example 4 | 3.25b | 2.85b | 6.10b | 3.6b |
| | Comparative example 5 | 4.12a | 3.27a | 7.39a | 4.3b |
| | Example 4 | 4.35a | 3.54a | 7.89a | 4.5a |
| 60 d | Comparative example 1 | 9.68a | 8.53a | 18.21a | 4.9a |
| | Comparative example 2 | 7.56b | 7.78b | 15.34b | 4.1b |
| | Comparative example 3 | 7.96b | 8.12a | 16.08b | 4.3a |
| | Comparative example 4 | 7.48b | 7.65b | 15.13b | 4.0b |
| | Comparative example 5 | 8.75a | 8.17a | 16.92a | 4.5a |
| | Example 4 | 9.35a | 8.47a | 17.82a | 4.7a |
| 90 d | Comparative example 1 | 9.78a | 9.72a | 19.5a | 4.9a |
| | Comparative example 2 | 8.12b | 7.89b | 16.01c | 4.1b |
| | Comparative example 3 | 8.34b | 8.14b | 16.48b | 4.2b |
| | Comparative example 4 | 7.98b | 7.63b | 15.61c | 4.0b |

TABLE 1-continued

Influence of compound mycorrhizal growth promoting agent on chlorophyll content and net photosynthetic rate of *Dioscorea composita*

| Sampling time | Treatment | Chlorophyll a (%) | Chlorophyll b (%) | Total chlorophyll (%) | Net photosynthetic rate ($\mu mol \cdot m^{-2} \cdot s^{-1}$) |
|---|---|---|---|---|---|
| | Comparative example 5 | 8.95a | 8.54a | 17.49b | 4.7a |
| | Example 4 | 9.52a | 9.58a | 19.10a | 4.8a |

Note:
data in the table were average values of 5 plants; and different letters in each column indicated a 0.05significant level.

(3) Influence of Compound Mycorrhizal Fungus Growth Promoting Agent for *Dioscorea composita* on Growth Amount of *Dioscorea composita*

As shown in Table 2, after inoculated with different compound mycorrhizal fungus growth promoting agents for *Dioscorea composita*, the nutritional growth of the *Dioscorea composita* cutting seedling was improved to different degrees, wherein an effect of example 4 was the best. After 60 days, a plant height of the inoculated plant planted under a photovoltaic panel was increased by about 29% compared with the uninoculated plant, a fresh weight of an overground part was increased by 14.1%, and a fresh weight of an underground part increased by 19.6%. At 90 days of inoculation, compared with the plant grown under normal illumination (i.e. comparative example 1), the plant in example 4 had a plant height about 91.7%, a fresh weight of an overground part about 90.3% and a fresh weight of an underground part about 92.7%. In addition, the number of secondary roots of the inoculated plant planted under a photovoltaic panel was obviously more than that of the uninoculated plant under a photovoltaic panel and the plant grown under normal illumination, indicating that the inoculation with the compound mycorrhizal growth promoting agent can obviously promote the nutritional growth of the *Dioscorea composita* cutting seedling.

TABLE 2

Influence of compound mycorrhizal growth promoting agent on growth amount of *Dioscorea composita*

| Sampling time | Treatment | Infection rate | Plant height (cm) | Fresh weight of overground part (g/plant) | Fresh weight of underground part (g/plant) | Number of secondary roots/plant |
|---|---|---|---|---|---|---|
| 30 d | Comparative example 1 | / | 40a | 70a | 13a | 13b |
| | Comparative example 2 | / | 41a | 65a | 12a | 12b |
| | Comparative example 3 | 47% | 43a | 66a | 12a | 12b |
| | Comparative example 4 | 35% | 41a | 64a | 11a | 11c |
| | Comparative example 5 | 51% | 42a | 67a | 13a | 17a |
| | Example 4 | 65% | 45a | 71a | 15a | 19a |
| 60 d | Comparative example 1 | / | 85a | 175a | 112a | 27a |
| | Comparative example 2 | / | 62c | 149c | 92c | 23b |
| | Comparative example 3 | 65% | 70b | 163b | 103b | 25b |
| | Comparative example 4 | 55% | 65c | 151c | 95c | 21b |
| | Comparative example 5 | 69% | 73b | 167b | 105b | 30a |
| | Example 4 | 79% | 80a | 170a | 110a | 32a |
| 90 d | Comparative example 1 | / | 120a | 362a | 192a | 31a |
| | Comparative example 2 | — | 90c | 266d | 153c | 27b |
| | Comparative example 3 | 75% | 100b | 295c | 161b | 29b |
| | Comparative example 4 | 67% | 93c | 275d | 155c | 25b |
| | Comparative example 5 | 80% | 105b | 302b | 167b | 32a |
| | Example 4 | 87% | 110a | 327a | 178a | 35a |

Note:
data in the table were average values of 5 plants; and different letters in each column indicated a 0.05 significant level.

The foregoing examples are merely illustrative and used to explain some features of the method of the present disclosure. The appended claims are intended to claim a conceived broad scope as much as possible and the examples presented herein are demonstrated by results of actual tests by the applicant. Accordingly, it is the applicants' intention that the appended claims are not to be limited by choices of examples illustrating features of the present disclosure. Some value ranges used in claims also include all sub-ranges subsumed therein and variations within the ranges are also intended to be encompassed by the appended claims hereto where possible.

What is claimed is:

1. A compound mycorrhizal fungus growth promoting agent for *Dioscorea composita*, wherein the compound mycorrhizal fungus growth promoting agent consists of *Glomus mosseae, Streptomyces chartreusis* and *Flavisolibacter ginsengiterrae*; spore suspensions of the *Glomus mosseae, Streptomyces chartreusis* and *Flavisolibacter ginsengiterrae* have a concentration equal to or greater than 4,000 spores/mL; and based on volumes of the spore suspensions with the same concentration, a ratio of the *Glomus mosseae, Streptomyces chartreusis* and *Flavisolibacter ginsengiterrae* in the compound mycorrhizal fungus growth promoting agent is 3:3:1.

2. A microbial preparation for promoting growth and improving photosynthetic efficiency of *Dioscorea composita*, containing the compound mycorrhizal fungus growth promoting agent for *Dioscorea composita* according to claim 1.

3. An agricultural-photovoltaic complementary planting method for *Dioscorea composita*, comprising:

infecting a *Dioscorea composita* seedling with the compound mycorrhizal fungus growth promoting agent according to claim 1; and planting or growing the *Dioscorea composita* seedling beneath or between rows of photovoltaic panels.

4. The agricultural-photovoltaic complementary planting method for *Dioscorea composita* according to claim 3, comprising:

infecting the *Dioscorea composita* seedling by soaking a root of a *Dioscorea composita* cutting seedling with the compound mycorrhizal fungus growth promoting agent; and field-planting the seedling beneath or between rows of photovoltaic panels in nutrient soil containing the compound mycorrhizal fungus growth promoting agent.

5. The agricultural-photovoltaic complementary planting method for *Dioscorea composita* according to claim 4, wherein the nutrient soil is obtained by cultivating *Trifolium repens* with the compound mycorrhizal fungus growth promoting agent for *Dioscorea composita* in the soil, and preparing the nutrient soil containing a spore, a mycelium and an infected root segment.

* * * * *